US007613413B2

(12) United States Patent
Asada

(10) Patent No.: US 7,613,413 B2
(45) Date of Patent: Nov. 3, 2009

(54) IMAGE FORMING SYSTEM FOR EXECUTING A PLURALITY OF FUNCTIONS HAVING STORED SETS OF CONDITIONS

(75) Inventor: Kei Asada, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 190 days.

(21) Appl. No.: 11/822,808

(22) Filed: Jul. 10, 2007

(65) Prior Publication Data

US 2008/0085132 A1 Apr. 10, 2008

(30) Foreign Application Priority Data

Oct. 6, 2006 (JP) ............................ 2006-275319

(51) Int. Cl.
*G03G 15/00* (2006.01)
*G06F 3/12* (2006.01)

(52) U.S. Cl. ........................................ 399/83; 358/1.13

(58) Field of Classification Search .................. 399/81, 399/83, 85; 358/1.13, 1.15, 1.16, 1.18
See application file for complete search history.

(56) References Cited

U.S. PATENT DOCUMENTS

| | | | | |
|---|---|---|---|---|
| 5,565,964 | A * | 10/1996 | Tashiro et al. | 399/83 |
| 6,618,061 | B2 * | 9/2003 | Yamamoto | 715/817 |
| 6,795,663 | B2 * | 9/2004 | Kato | 399/81 |
| 7,248,379 | B2 * | 7/2007 | Yoshioka | 358/1.13 |
| 2006/0171732 | A1 * | 8/2006 | Yamada | 399/81 |
| 2007/0212100 | A1 * | 9/2007 | Kimoto et al. | 399/81 |

FOREIGN PATENT DOCUMENTS

| | | |
|---|---|---|
| JP | A 8-18723 | 1/1996 |
| JP | A 9-185469 | 7/1997 |
| JP | A 2002-42119 | 2/2002 |
| JP | A 2002-202695 | 7/2002 |
| JP | A 2003-87445 | 3/2003 |
| JP | A 2005-119095 | 5/2005 |
| JP | A 2005-316053 | 11/2005 |
| JP | A 2006-159519 | 6/2006 |

* cited by examiner

*Primary Examiner*—Robert Beatty
(74) *Attorney, Agent, or Firm*—Oliff & Berridge, PLC

(57) ABSTRACT

An image forming apparatus includes a first execution unit that executes a first function, a memory that stores one or more conditions for execution of the first function, and a second execution unit that, when executing a second function, reads the one or more conditions stored in the memory, and executes the second function in accordance with the one or more conditions.

6 Claims, 15 Drawing Sheets

FIG. 11
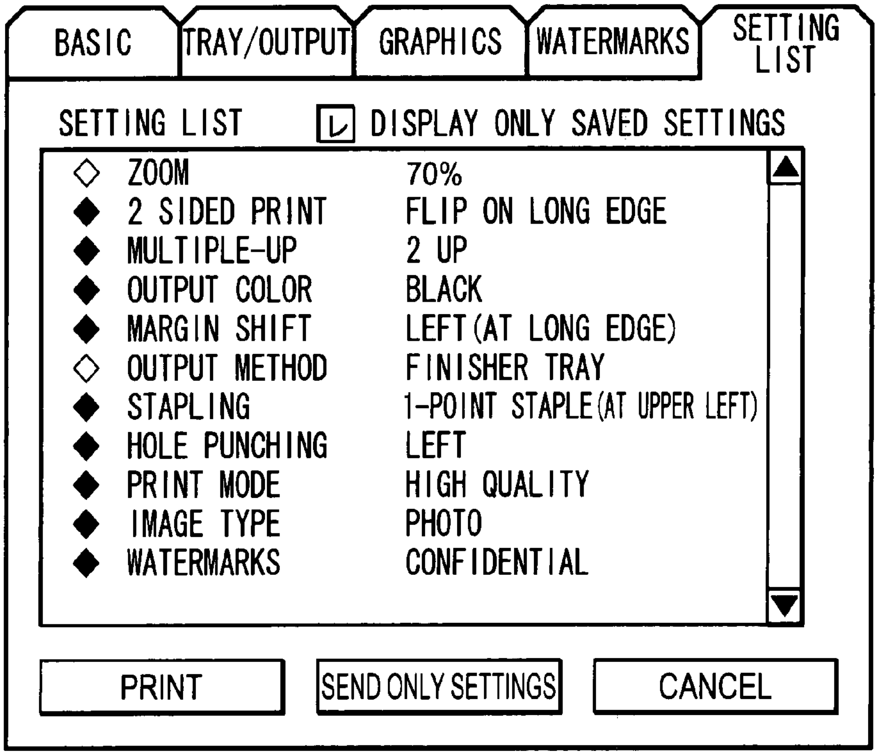
FIG. 12
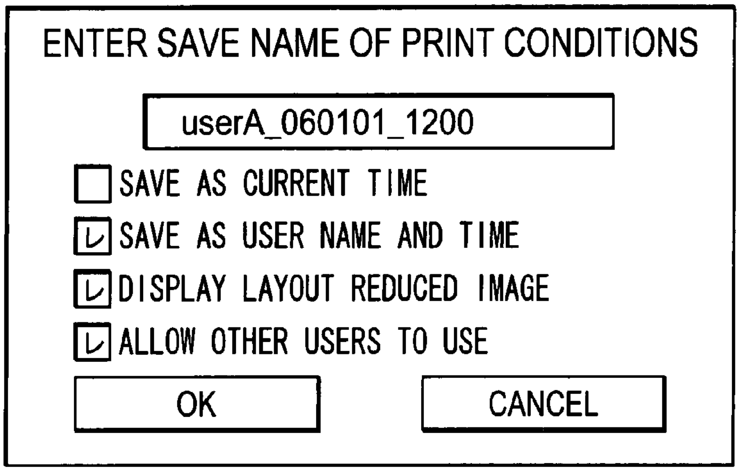
FIG. 13
| ITEM | CONDITION | SAVE FLAG |
|---|---|---|
| ⋮ | ⋮ | ⋮ |
| ZOOM | 70 | 1 |
| 2-SIDED | 2 | 1 |
| ⋮ | ⋮ | ⋮ |
| STAMP | (IMAGE DATA) | 1 |
| ⋮ | ⋮ | ⋮ |

IMAGE FORMING SYSTEM FOR EXECUTING A PLURALITY OF FUNCTIONS HAVING STORED SETS OF CONDITIONS

CROSS-REFERENCE TO RELATED APPLICATIONS

This application is based on and claims priority under 35 USC 119 from Japanese Patent Application No. 2006-275319 filed on Oct. 6, 2006.

BACKGROUND

Technical Field

The present invention relates to an image forming apparatus, a computer, an image forming system, a computer readable medium, an image forming method, and a computer data signal.

SUMMARY

An aspect of the present invention provides an image forming apparatus includes a first execution unit that executes a first function, a memory that stores one or more conditions for execution of the first function, and a second execution unit that, when executing a second function, reads the one or more conditions stored in the memory, and executes the second function in accordance with the one or more conditions.

BRIEF DESCRIPTION OF THE DRAWINGS

Exemplary embodiments of the present invention will now be described in detail with reference to the following figures, wherein:

FIG. 11 is a diagram illustrating an example of a dialog box in which a checkbox is checked;

FIG. 12 is a diagram illustrating an example of a dialog box;

FIG. 13 is a diagram illustrating an example of a data format of conditional data;

DETAILED DESCRIPTION

(1) Exemplary Embodiment

An exemplary embodiment of the present invention will be described with reference to the drawings.

Figure 1:
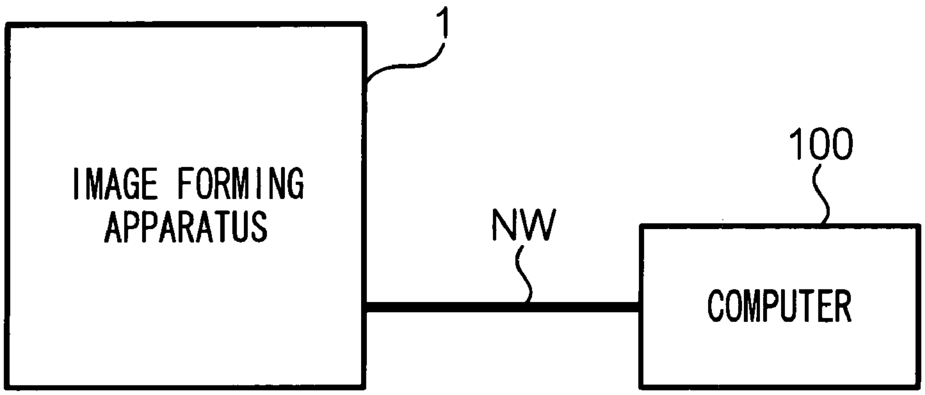
FIG. 1 is a diagram illustrating a system configuration according to an exemplary embodiment of the present invention.

FIG. 1 is a diagram illustrating a system configuration according to the present exemplary embodiment. In the drawing, image forming apparatus 1 and computer 100 are connected with communication network NW such as a LAN (Local Area Network).

(1-1) Computer 100

Figure 2:
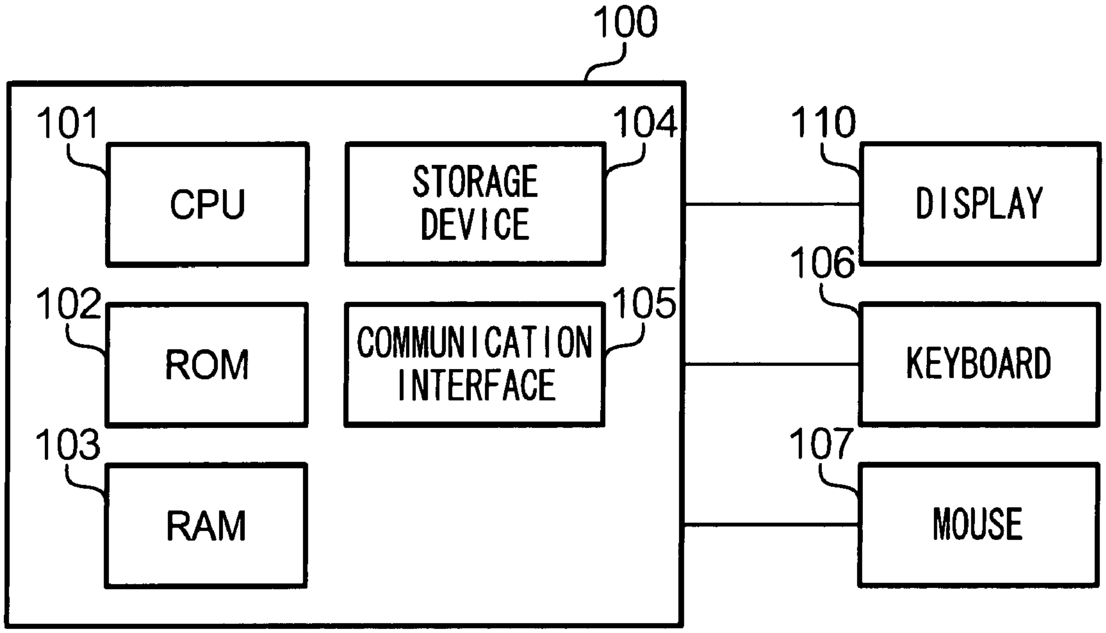
FIG. 2 is a diagram illustrating a configuration of computer 100.

FIG. 2 is a diagram illustrating a configuration of computer 100. As shown in the drawing, computer 100 includes CPU (Central Processing Unit) 101, ROM (Read Only Memory) 102, RAM (Random Access Memory) 103, and storage device 104. Storage device 104 may be a hard disk, and stores an OS (Operating System). Storage device 104 also stores data input from an external source. ROM 102 stores an IPL (Initial Program Loader). When computer 100 is turned on, the IPL is executed by CPU 101. Subsequently, an OS is read from storage device 104 and executed by CPU 101. Consequently, management of the components of computer 100 is started. RAM 103 is used as a work area when CPU 101 runs a program. Communication interface 105 is connected to communication network NW, and enables a data exchange between computer 100 and image forming apparatus 1.

Computer 100 is connected to keyboard 106 and mouse 107, by means of which a user inputs an instruction into computer 100. Computer 100 also is connected to display 110, which is, for example, a liquid crystal display.

Storage device 104 also stores program WP for enabling computer 100 to serve as a word processor. CPU 101 executes program WP in response to an instruction from a user input via keyboard 106 or mouse 107. When program WP is executed, a window for documentation is displayed on display 110, and a user makes a document using keyboard 106 and/or mouse 107. If storage of a prepared document is instructed by a user, document data representing the document is generated, and stored in storage device 104. Document data is written in the page-description language, and contains character data, bit-mapped image data, and layout data.

Storage device 104 also stores printer driver PD that is a program for selecting conditions for image forming by image forming apparatus 1. Printer Driver PD is executed by CPU 101 in response to an instruction from a user, and causes display 110 to display a menu screen for selecting conditions for image forming. When a selection of displayed conditions is made by a user using keyboard 106 or mouse 107, conditional data representing the selected conditions is generated by CPU 101, and sent to image forming apparatus 1.

Now, functions provided by printer driver PD will be described. In the following description, the subject of an operation is CPU 101, unless otherwise specified.

Figure 3:
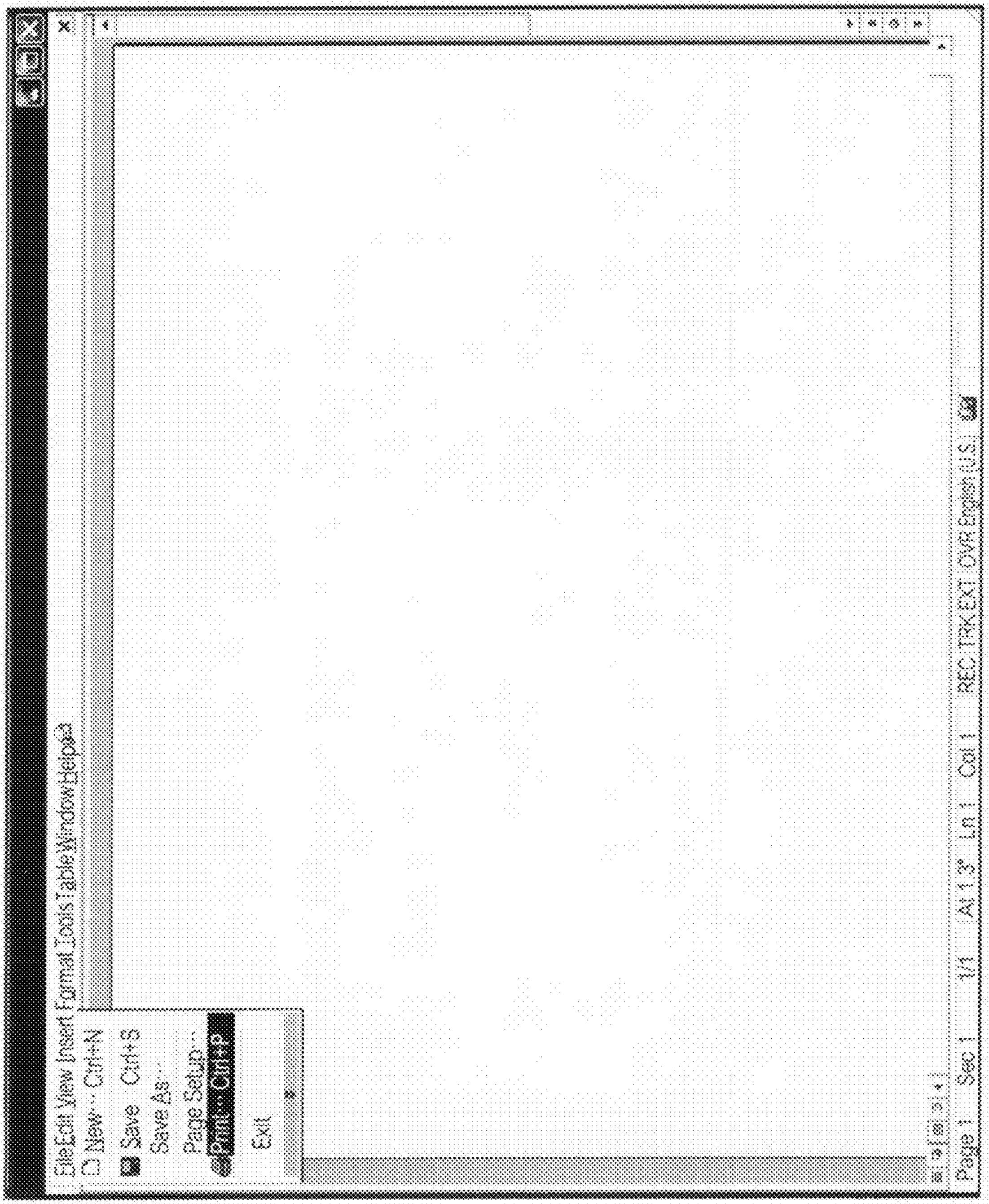
FIG. 3 is a diagram illustrating an example of a window.

Printer driver PD may be executed when program WP is run, in response to an instruction from a user for forming an image. FIG. 3 is a diagram illustrating an example of a window displayed on display 110 after program WP is executed. As shown in the drawing, a menu bar containing plural menus is displayed at the top of the window, and a document in the process of being created is displayed in a rectangular area under the menu bar. If a "File" menu in the menu bar is clicked by a user with mouse 107, a pull-down menu is displayed as shown in FIG. 3. In this situation, if a "Print" menu is clicked, printer driver PD is executed by CPU 101. It is to be noted that in the following description, to "print" means to form an image on a recording medium by image forming apparatus 1.

Figure 4:
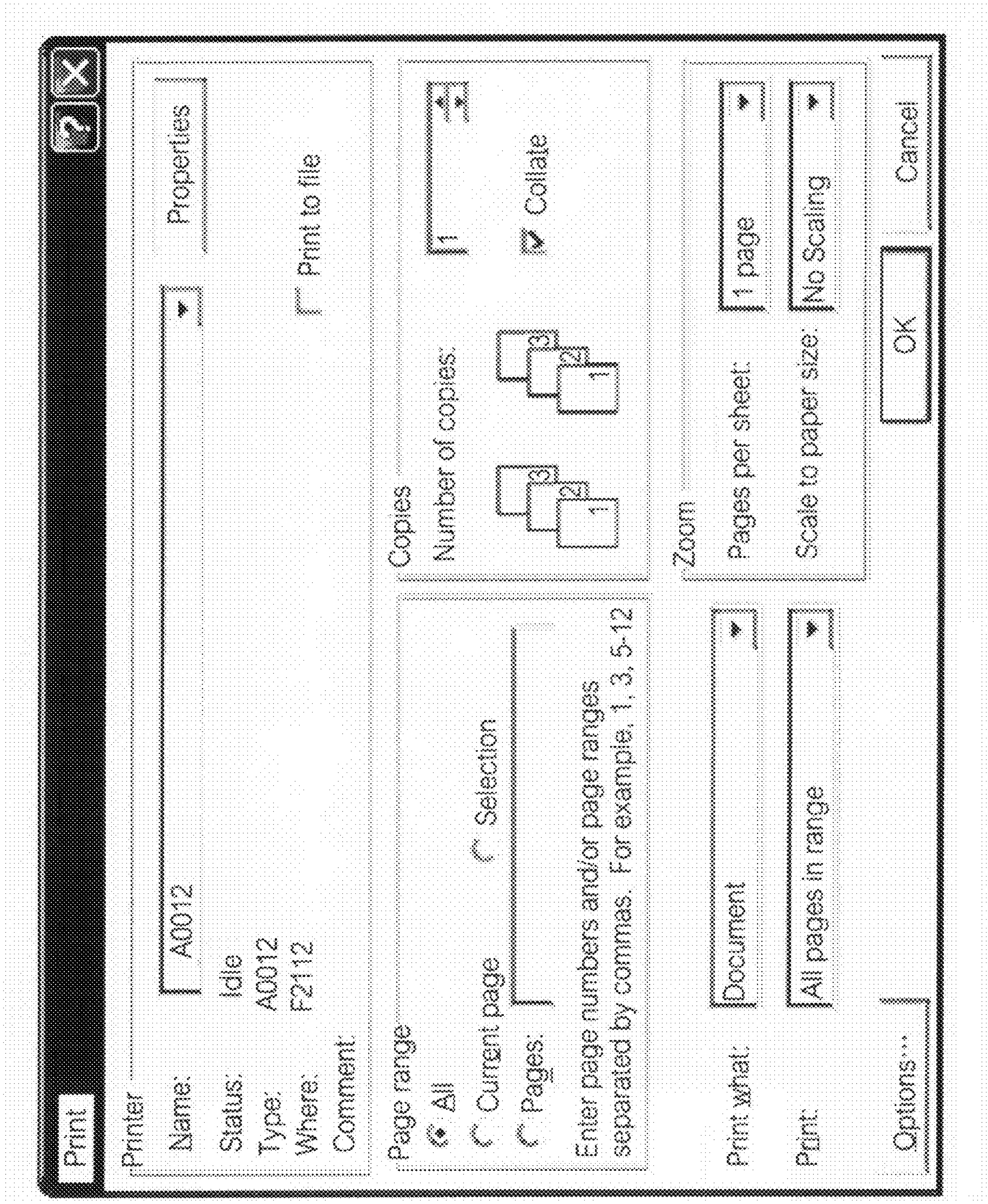
FIG. 4 is a diagram illustrating an example of a dialog box.

FIG. 4 is a diagram illustrating an example of a dialog box that is displayed after printer driver PD is executed. The dialog box is used to select the most basic conditions for image forming. A user who wishes to select further detailed conditions clicks a "Properties" button at the upper-right corner of the dialog box, using mouse 107.

Figure 5:
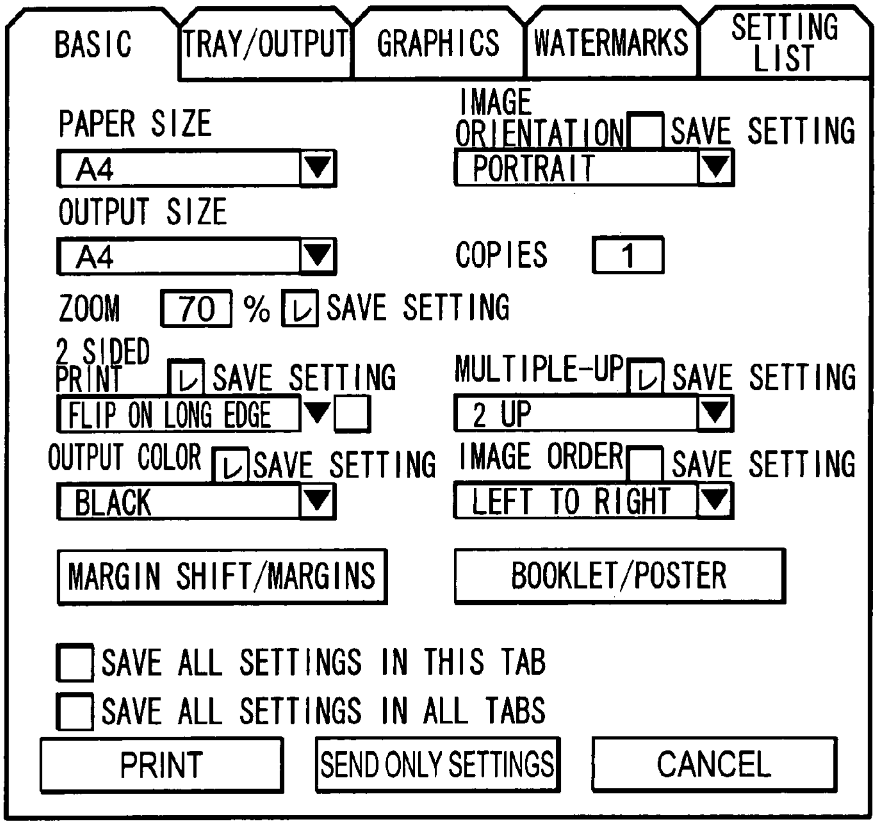
FIG. 5 is a diagram illustrating an example of a dialog box that is first displayed when a "Properties" button is clicked.

FIG. 5 is a diagram illustrating an example of a dialog box that is first displayed after the "Properties" button is clicked. Conditions selectable using printer driver PD are divided into four categories of "Basic", "Tray/Output", "Graphics", and "Watermarks", and tabs of the categories are displayed at the top of the dialog box. If one of the tabs is clicked by a user using mouse 107, a dialog box associated with the tab is displayed. The dialog box shown in FIG. 5 is a dialog box of a "Basic" category.

Now, an operation by a user of selecting conditions for image forming will be described with reference to FIG. 5.

The dialog box shown in FIG. 5 contains pull-down menus and entry fields for items "Paper Size", "Output Size", "Zoom", "Image Orientation", "Copies", "2 Sided Print", "Output Color", "Multiple-Up" (a feature of printing images of plural pages on a single recording medium), and "Image Order" (a display sequence of images of which plural pages are printed on a single recording medium), and default values are set for each entry field.

In the dialog box, when a "Margin Shift/Margins" button is clicked by a user, a dialog box for specifying a position of a binding margin and a width of a margin of a recording medium is displayed (not shown). Similarly, when a "Booklet/Poster" button is clicked by a user, a dialog box for specifying conditions for preparation of a booklet and for a poster (a feature of printing an image enlarged over plural recording mediums) is displayed (not shown).

When a "Multiple-Up" feature is used, CPU 101 obtains magnification from an image size and a paper size. For example, if an image size is A4, a paper size is A4, and an item "2 up" is selected in a pull-down menu of a "Multiple-Up" item, magnification of 70 percent is obtained. Therefore, a user does not need to specify magnification, to form an image at proper magnification.

As illustrated by the foregoing, CPU 101 running printer driver PD is able to automatically obtain and display a value of a condition from other conditions specified by a user.

Figure 6:
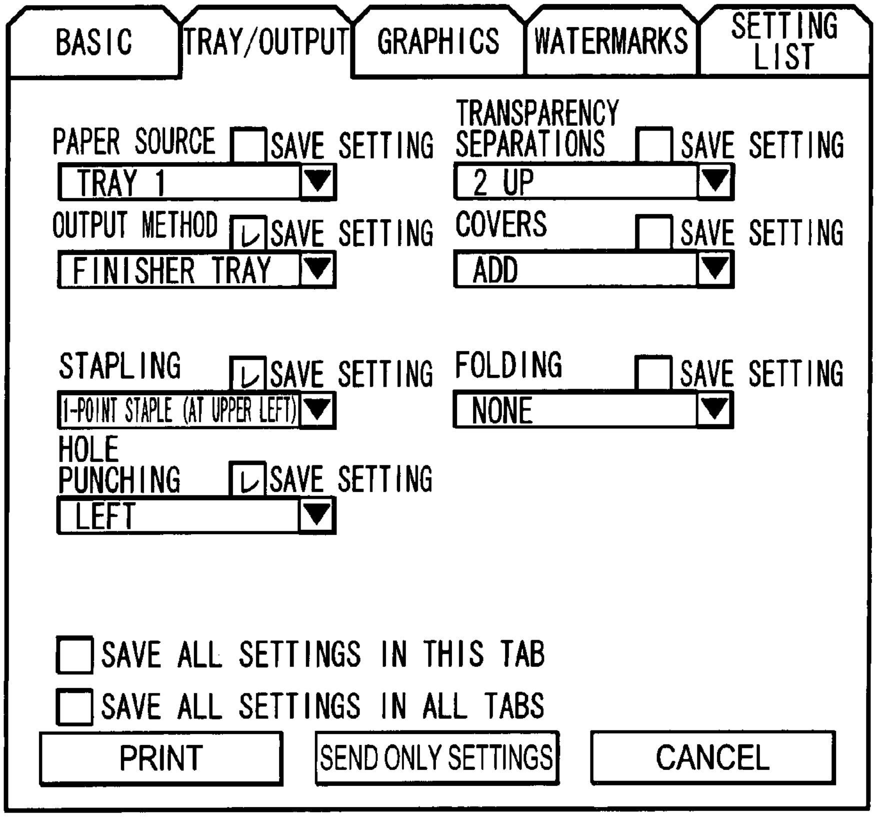
FIG. 6 is a diagram illustrating an example of a dialog box of a "Tray/Output" category.

FIG. 6 is a diagram illustrating an example of a dialog box of a "Tray/Output" category. Image forming apparatus 1 has plural medium feeder trays housing different sizes of mediums, and one of them can be selected from a pull-down menu of a "Paper Source" item. Image forming apparatus 1 also has plural medium catch trays such as a normal catch tray onto which an image-formed recording medium is merely output, and a finisher tray on which post treatment such as stapling is carried out, and one of them can be selected from a pull-down menu of an "Output Method" item. Image forming apparatus 1 also has features of "Transparency separations", "Covers", "Stapling", "Hole Punching", "Folding", and they can be enabled from a pull-down menu of each item.

Figure 7:
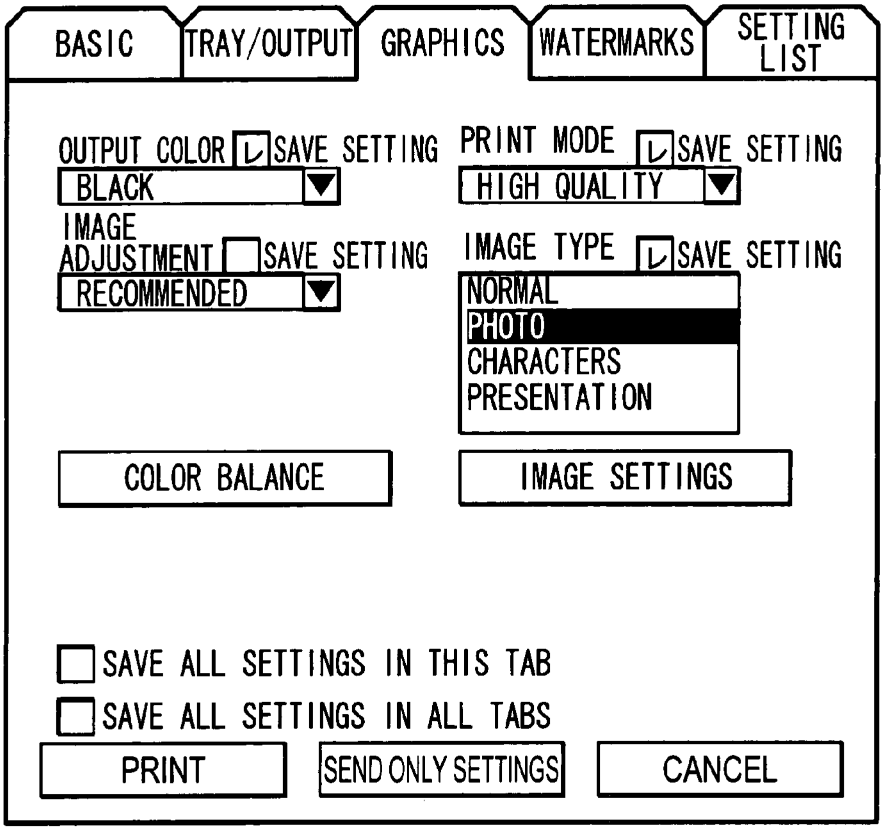
FIG. 7 is a diagram illustrating an example of a dialog box of a "Graphics" category.

FIG. 7 is a diagram illustrating an example of a dialog box of a "Graphics" category. A pull-down menu of an "Image Adjustment" is used for selecting a mode of an image adjustment. A pull-down menu of a "Print Mode" is used for selecting either "Standard" or "High Quality". A pull-down menu of an "Image type" is used for selecting a mode of an image adjustment suitable for an image type. When a "Color Balance" button or an "Image Settings" button is clicked, a dialog box for configuring advanced settings of the clicked item is displayed (not shown).

Figure 8:
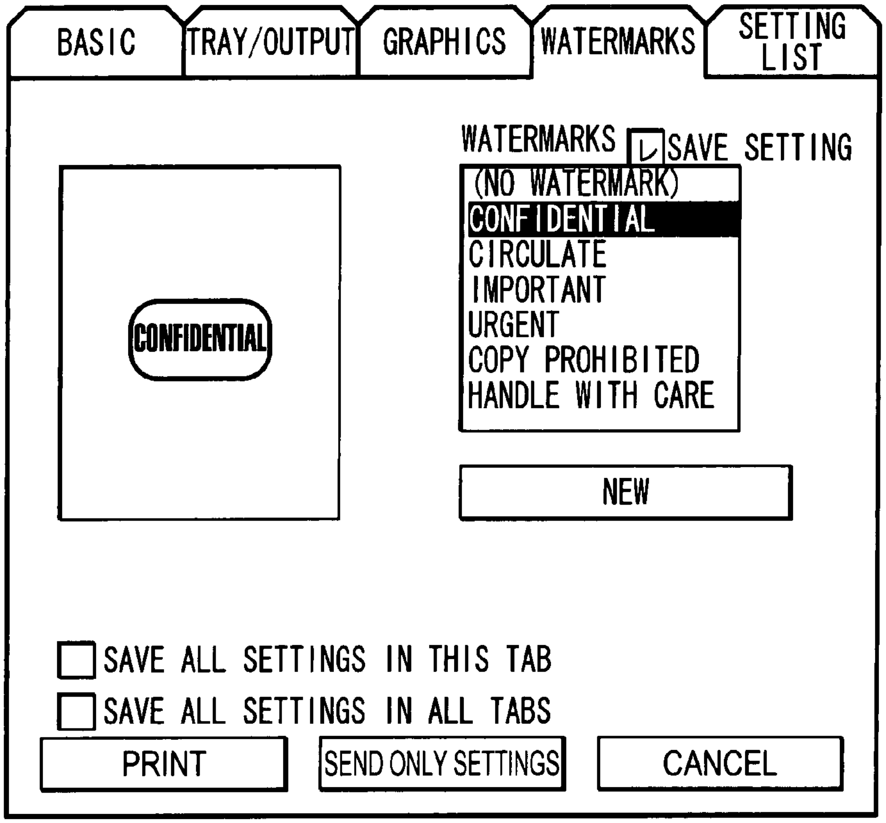
FIG. 8 is a diagram illustrating an example of a dialog box of a "Watermarks" category.

FIG. 8 is a diagram illustrating an example of a dialog box of a "Watermarks" category. A watermark is an image of text or a mark printed on a margin or a background of a document. Printer Driver PD has image data of several types of watermarks, and a user can select one of them. When a "New" button is clicked, a dialog box for creating an image of a new watermark is displayed (not shown).

Conditions selected in each dialog box can be stored in image forming apparatus 1.

The dialog boxes shown in FIGS. 5 to 8 have one or more "Save Setting" check boxes, each of which is arranged adjacent to each item of the dialog box. A user wishing to save a condition in image forming apparatus 1 clicks a checkbox for the condition, using mouse 107. In the clicked checkbox, a checkmark is displayed.

Figure 9:
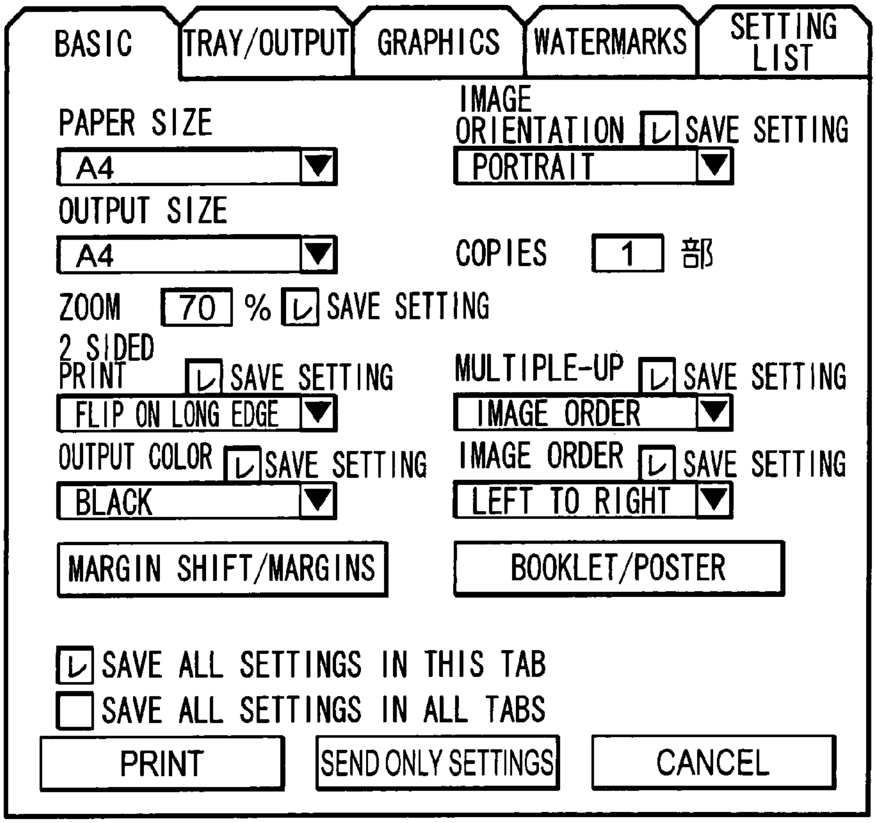
FIG. 9 is a diagram illustrating an example of a dialog box in which some checkboxes are checked.

The dialog boxes shown in FIGS. 5 to 8 also have a "Save All Settings in This Tab" checkbox at the lower section of each dialog box. If a user checks the checkbox, all "Save Setting" checkboxes of a displayed dialog box are checked, and all settings are saved. FIG. 9 is an example of a dialog box of a "Basic" category in which a "Save All Settings in This Tab" checkbox is checked. In contrast to the dialog box of FIG. 5 in which settings of only four items "Zoom", "2 Sided Print", "Output Color", and "Multiple-Up" are selected for saving, in the dialog box of FIG. 9 settings of all six items with a "Save Setting" checkbox are selected for saving.

The dialog boxes shown in FIGS. 5 to 8 also have a "Save All Settings in All Tabs" checkbox at the lower section of each dialog box. If a user checks the checkbox, not only "Save Setting" checkboxes of a displayed dialog box, but also "Save Setting" checkboxes of the other dialog boxes are checked, and all settings are saved. For example, if a "Save All Settings in All Tabs" of a dialog box of a "Basic" category is checked, all "Save Setting" checkboxes of not only the dialog box, but also of "Tray/Output", "Graphics", "Watermarks" categories are checked, and all settings are saved.

Figure 10:
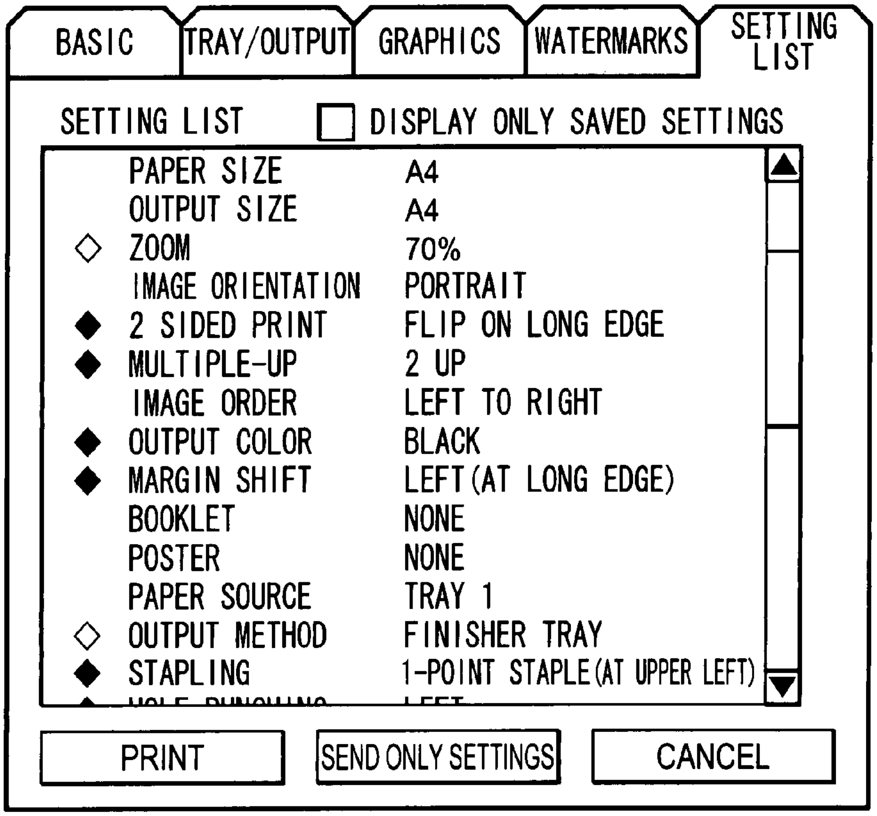
FIG. 10 is a diagram illustrating an example of a dialog box of a "Setting List" category.

On the right side of a "Watermarks" tab is a "Setting List" tab. FIG. 10 is a diagram illustrating an example of a dialog box displayed after a "Setting List" tab is clicked. The dialog box displays a list of item names and corresponding conditions that are set in a dialog box of each category. On the left side of each item that is set to be saved is displayed a diamond-shaped mark. A solid diamond-shaped mark indicates that the item has been saved responsive to an instruction input by a user.

On the other hand, an outline diamond-shaped mark indicates that the item has been automatically saved by CPU 101 in association with an instruction input by a user for saving another item. For example, if a user turns on a "Stapling" feature in a dialog box of a "Tray/Output" category, and checks a "Save Setting" checkbox, since a recording medium has to be output onto a finisher tray to be stapled, CPU 44 sets a finisher tray as an output method, regardless of a user's selection, and saves the condition.

As in the foregoing example, if a user sets an item to be saved, and another item is automatically set to be saved in association with the user's setting, an outline diamond-shaped mark is displayed on the left side of the item.

The dialog box of a "Setting List" category has a "Display Only Saved Settings" checkbox. FIG. 11 is a diagram illustrating an example of a dialog box in which the checkbox is checked. As shown in the drawing, if the checkbox is checked, only items to be saved are listed. Alternatively, the dialog box is pre-configured to list only items to be saved as shown in FIG. 11, in response to a click on a "Setting List" tab.

The dialog boxes of the categories described above have a "Print" button, a "Send Only Settings" button, and a "Cancel" button.

A "Print" button is a button for sending data for forming an image to image forming apparatus 1. When a user clicks a "Print" button using mouse 107, CPU 101 generates document data of a displayed document. CPU 101 also generates conditional data representing conditions selected in each dialog box, and sends the document data and the conditional data to image forming apparatus 1.

A "Send Only Settings" button is a button for sending conditional data to image forming apparatus 1, and causing the apparatus to store the conditional data. When the button is pressed, document data is not sent to image forming apparatus 1, and an image is not formed.

A "Cancel" button is a button for canceling a selection of conditions.

FIG. 12 is a diagram illustrating an example of a dialog box displayed after a "Print" button or a "Send Only Settings" button is clicked. The dialog box has an entry field in which text can be entered, and "Save Name" for identifying conditional data is entered in the entry field. When a "Save As Current Time" checkbox is checked, a current date and time is automatically entered as a name to be saved. When a "Save As User Name and Time" checkbox is checked, a user name and a time are automatically entered as a name to be saved. FIG. 12 shows an example of a dialog box displayed after the checkbox is checked. In the drawing, "userA" is a user name, and "060101_1200", which means Jan. 1, 2006, 12:00, is a date and time. Computer 100 has a clock function and a calendar function (neither of which is shown), and CPU 101 identifies a time and date by means of the functions. A user name is pre-stored in storage device 104, and CPU 101 reads the user name from storage device 104.

The dialog box of FIG. 12 also has a "Display Layout Reduced Image" checkbox. A layout reduced image is a reduced image of a page layout that is formed in accordance with conditional data. Image data of a reduced image may be generated by CPU 101 and attached to conditional data, or may be generated by image forming apparatus 1 in response to an instruction to generate the image that is received together with conditional data. A reduced image is used for selecting conditional data, as will hereinafter be described in detail.

The dialog box of FIG. 12 also has an "Allow Other Users To Use" checkbox. If the checkbox is checked, a flag representing "1" is set in conditional data, and if the checkbox is not checked, a flag representing "0" is set in conditional data. The checkbox is used, for example, when a user name or user ID is attached in a header or footer, or a watermark of a personal name or corporate name is used. In such a case, it is preferable to allow only the user or the corporation to use the conditional data; therefore, the checkbox is not checked. If the conditional data may be used by other users, the checkbox is checked.

Now, a data format of conditional data will be described. FIG. 13 is a diagram illustrating an example of a data format of conditional data.

As shown in the drawing, in the first field of conditional data is entered data representing an item of a condition. In the second field is entered data representing content of a condition. In the third field is entered a flag indicating whether an item is to be saved.

Taking an item of "2 Sided Print" of a "Basic" category as an example, in the first field of conditional data is entered a keyword "2-SIDED". A condition is either "None", "Flip on Short Edge", or "Flip on Long Edge". A default setting of a pull-down menu of a "2 Sided Print" item is "None", and a default value of the second field of conditional data is "0". If a user selects "Flip on Short Edge", "1" is set in the second field, and if a user selects "Flip on Long Edge", "2" is set in the second field. A "Save Setting" checkbox is not checked by default, and "0" is set in the third field of conditional data. If a user check the checkbox, "1" is set in the third field.

In a case of an item "Zoom" of a "Basic" category, in the first field of conditional data is entered a keyword "ZOOM", and in the second field is entered a value indicative of magnification.

In a case where a watermark is set in a dialog box of a "Watermarks" category, in the first field of conditional data is entered a keyword "WATERMARK", and in the second field is entered image data representing a watermark.

(1-2) Image Forming Apparatus 1

Figure 14:
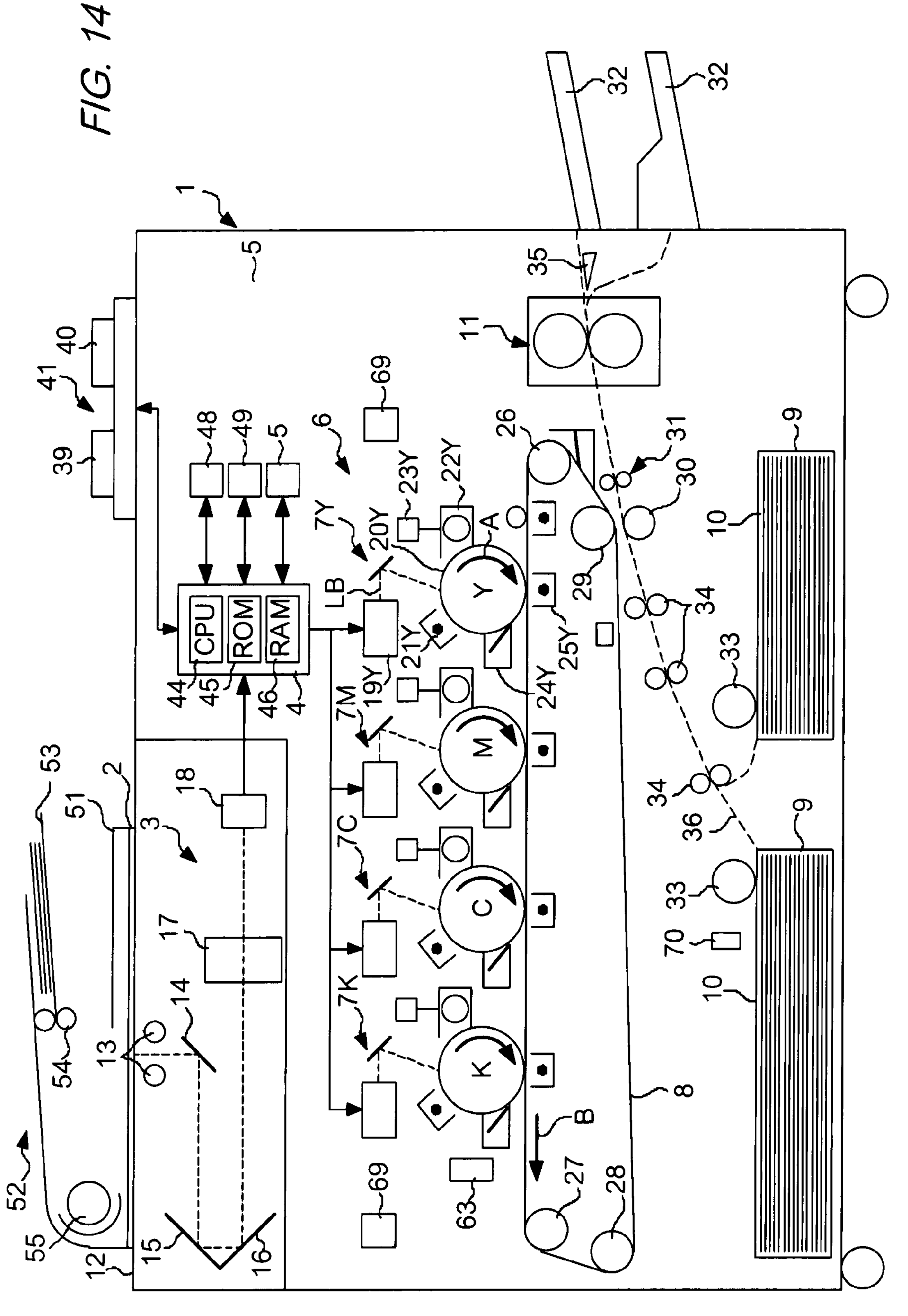
FIG. 14 is a diagram illustrating a hardware configuration of image forming apparatus 1.

FIG. 14 is a diagram illustrating a hardware configuration of image forming apparatus 1.

Controller 4 includes CPU (Central Processing Unit) 44, ROM (Read Only Memory) 45, and RAM (Random Access Memory) 46. Storage device 5 is a nonvolatile storage such as a hard disk. Storage device 5 stores an OS (Operating System), and also stores data input from outside. Storage device 5 further stores program P that enables a procedure carried out by image forming apparatus 1. Program P will be described later in detail. ROM 45 stores an IPL (Initial Program Loader). When image forming apparatus 1 is turned on, an IPL is executed by CPU 44. Subsequently, an OS is read from storage device 5 and executed by CPU 44. Consequently, management of the components of image forming apparatus 1 is started. RAM 46 is used as a work area when CPU 44 is running a program.

User interface 41 includes display 39 and keypad 40, by means of which a user can provide an instruction to image forming apparatus 1. Display 39 may be a liquid crystal panel. Storage device 5 stores image data of menu screens for selecting conditions for copying, and display 39 displays the menu screens on the basis of the image data. Display 39 has a touch sensor (not shown). Keypad 40 has a start key, a stop key, a reset key, a menu key, and numeric keys. An instruction input via user interface 41 is provided to CPU 44, and CPU 44 controls image forming apparatus 1 in accordance with the instruction.

Communication interface 48 is connected to communication network NW, and enables data exchange between image forming apparatus 1 and computer 100.

Fax communication interface 49 is connected to a line switching network, and a telephone number is assigned to image forming apparatus 1. Fax communication interface 49 enables transmission of image data to a specified destination or reception of image data sent from outside.

Image input unit 12 is a scanner that optically reads a document and output signals. A document placed on platen glass 2 is subject to light irradiated from light source 13. The Light reflected by the document is, after being reflected by mirrors 14, 15, and 16, collected by lens 17, and received by light receiver 18 such as a CCD (Charge-coupled Device). The light received by light receiver 18 is converted into signals, and sent to controller 4. Controller 4 generates, on the basis of the signals, pieces of image data representing an image of yellow, magenta, cyan, or block.

Cover 51 of platen glass 2 is provided with document feeder 52. Document feeder 52 includes document tray 53 on which original documents are placed, rollers 54 that feed documents placed on document tray 53 one-by-one, and roller 55 that feeds a document fed by rollers 54 onto platen glass 2.

Image output unit 6 includes image forming engines 7Y, 7M, 7C, and 7K, and transfer belt 8. Each of image forming engines 7Y, 7M, 7C, and 7K forms a toner image of yellow, Magenta, Cyan, or Black, respectively. Since the image forming engines have a common configuration, a description of only image forming engine 7Y will be provided.

Image forming engine 7Y includes photosensitive drum 20Y, and exposure unit 19Y, charging unit 21Y, development unit 22Y, and transfer unit 25Y that are provided around photosensitive drum 20Y.

Photosensitive drum 20Y has a photoconductive surface.

Charging unit 21Y charges the surface of photosensitive drum 20Y that is caused to rotate in the direction of arrow A at a predetermined potential.

Exposure unit 19Y is a scanning optical system that irradiates exposure beam LB to the surface of photosensitive drum 20Y. Charging unit 19Y has a semiconductor laser and a polygon mirror (neither of which is shown). Charging unit 19Y receives image data generated in controller 4, and causes the semiconductor laser to generate exposure beam LB on the basis of the image data. The polygon mirror is caused to rotate at a predetermined angular speed. Exposure beam LB generated by the semiconductor laser is reflected by the polygon mirror, and the surface of photosensitive drum 20Y is scanned with the reflected beam in a main scanning direction at a predetermined speed. The main scanning direction is a direction in which a line, by unit of which a latent image is formed on the surface of photosensitive drum 20Y by exposure unit 19Y, extends. The main scanning direction corresponds to a direction in which a rotation axis of photosensitive drum 20Y extends. A sub-scanning direction is a direction perpendicular to the main scanning direction, and an exposure by unit of a line is repeated in the sub-scanning direction, as photosensitive drum 20Y rotates.

A potential of a surface area of photosensitive drum 20Y which is exposed to exposure beam LB decreases to a predetermined level, and consequently an electrostatic latent image is formed on the surface of photosensitive drum 20Y in accordance with image data.

Development unit 22Y develops an electrostatic latent image formed on the surface of photosensitive drum 20Y with toner. Toner cartridge 23Y houses toner of yellow, and provides a given amount of toner to development unit 22Y. Development unit 22Y provides the toner onto the surface of photosensitive drum 20Y to cause the toner to stick to an electrostatic latent image, thereby forming a toner image.

Transfer belt 8 is suspended by rolls 26, 27, 28, and 29, and is caused to rotate in the direction of arrow B. Under photosensitive drum 20Y, there is provided with transfer unit 25Y so that transfer unit 25Y and photosensitive drum 20Y hold transfer belt 8 therebetween. When a predetermined voltage is applied to transfer unit 25Y, an electric field is produced by the applied voltage, and a toner image formed on the surface of photosensitive drum 20Y is transferred (first transfer) onto the surface of transfer belt 8 by the electric field.

Cleaner 24Y removes residual toner from the surface of photosensitive drum 20Y.

The foregoing is a description of a configuration of image forming engine 7Y. As in the case of image forming engine 7Y, a toner image of each color is formed by image forming engines 7M, 7C, and 7K, and they are transferred onto the surface of transfer belt 8 in layers.

Image forming engines 7Y, 7M, 7C, and 7K are, in the following description, referred to as "image forming engine 7", except where it is necessary to specify otherwise. Similarly, the units of image forming engines 7Y, 7M, 7C, and 7K are described without "Y", "M", "C", or "K", except where it is necessary to specify otherwise.

Medium tray 9 houses sheet-like recording media 10. When a toner image is formed on the surface of transfer belt 8, feed roll 33 is caused to rotate to feed recording media 10 from medium tray 9 one-by-one. Recording medium 10 fed by feed roll 33 is conveyed along conveyance path 36 by a pair of rolls 34. Image forming apparatus 1 has plural medium trays 9, which have different sizes of recording media 10, and CPU 44 selects one of the trays on the basis of paper size data, and drives feed roll 33 corresponding to the selected tray.

Transfer roll 30 is subject to an application of a predetermined voltage. Transfer belt 8 is caused to rotate in a direction of arrow B, and when a toner image formed on the surface of transfer belt 8 comes to transfer roll 30, transfer roll 30 is pressed against roll 29 across transfer belt 8 with a predetermined pressure. Recording medium 10 is conveyed into a contact area between transfer belt 8 and transfer roll 30, and as a result, a toner image on the surface of transfer belt 8 is transferred (second transfer) onto the surface of recording medium 10 by an electric field produced by a voltage applied to transfer roll 30 and an application of pressure.

Recording medium 10 onto which a toner image is transferred is conveyed to fixing unit 11 by a pair of rolls 31. Recording medium 10 is heated and pressurized by fixing unit 11, and consequently the toner image is fixed on the surface of recording medium 10. Downstream of fixing unit 11, there is provided guide 35, and further downstream, there are provided catch trays 32 that are large enough to hold maximum-sized recording medium 10. A catch tray 32 may be a normal catch tray onto which image-formed recording medium 10 is merely output or a finisher tray on which a post treatment such as stapling is carried out. CPU 44 swings guide 35 to direct recording medium 10 to catch tray 35 that is selected as an output method in received conditional data. Recording medium 10 is output onto the catch tray 32 and piled thereon.

Image forming apparatus 1 has plural functions such as a copying function, a printer function, a facsimile transmitting function, a facsimile receiving function, and a scanner function. To provide the functions, program P stored in storage device 5 includes module M1 for enabling image forming apparatus 1 to serve as a copier, module M2 for enabling image forming apparatus 1 to serve as a printer, module M3 for enabling image forming apparatus 1 to serve as a facsimile, and module M4 for enabling image forming apparatus 1 to serve as a scanner.

In the claims of the present application, the term "first function" means one of the above functions, and the term "second function" means one of the above functions other than the function indicated by the term "first function". In the present exemplary embodiment, a printer function is taken as "first function", and a coping function is taken as "second function".

Figure 15:
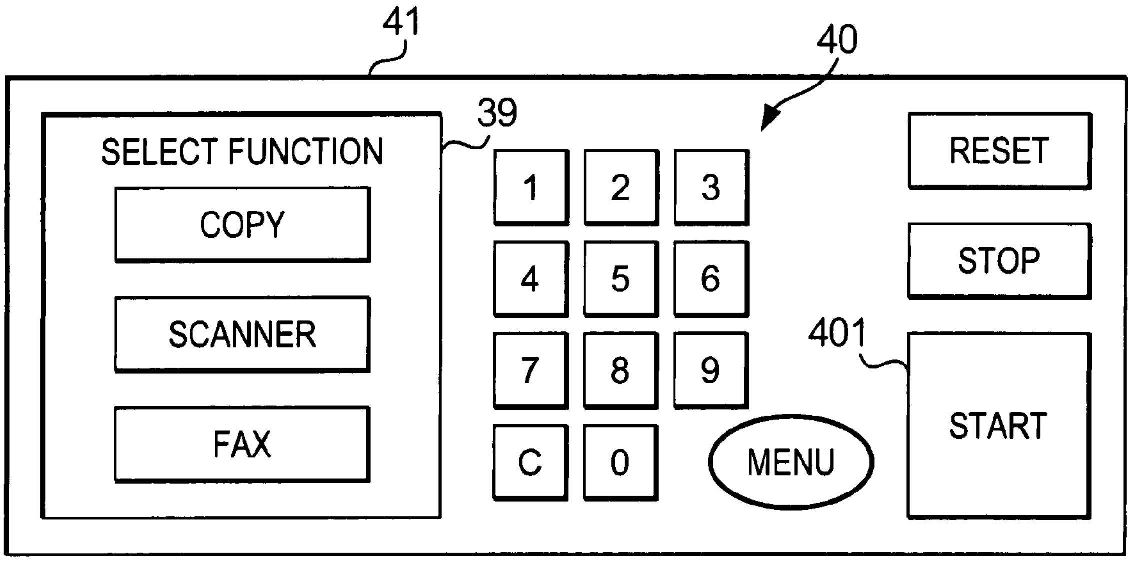
FIG. 15 is a diagram illustrating user interface 41.

FIG. 15 is a diagram illustrating user interface 41. When image forming apparatus 1 is turned on, CPU 44 executes program P, and consequently a menu screen is displayed on display 39 to allow a user to specify a function of image forming apparatus 1. If another screen is displayed on display 39, a user can cause the menu screen to appear by pressing a menu key of keypad 40.

Figure 16:
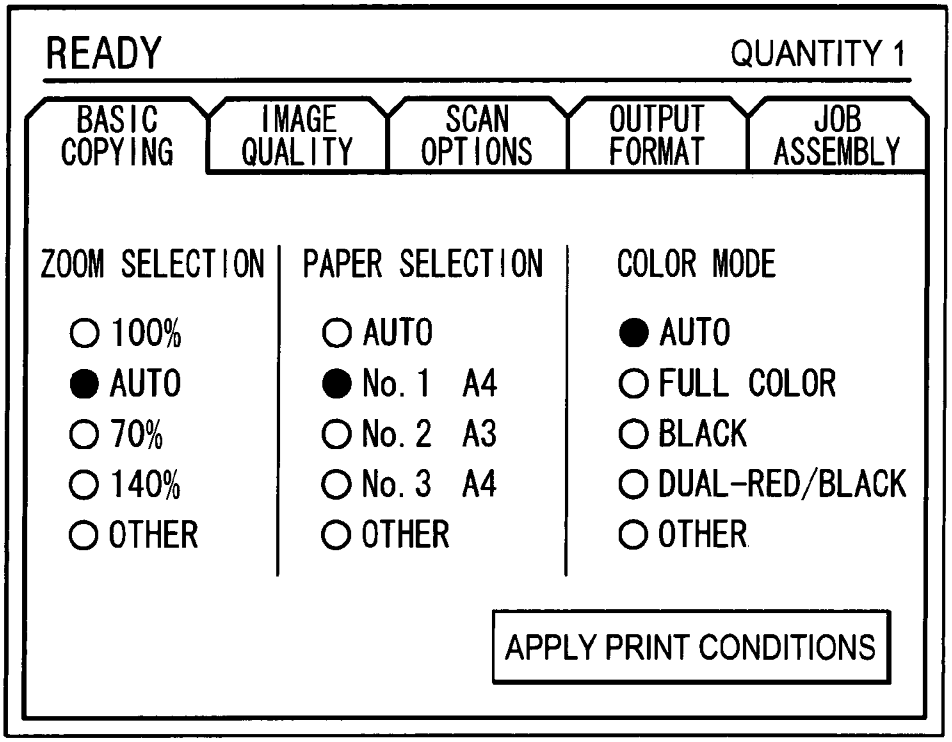
FIG. 16 is a diagram illustrating an example of a menu screen.

When a button "Copy" displayed on display 39 is touched by a user with his/her fingertip, CPU 44 executes module M1. As a result, a menu screen shown in FIG. 16 is displayed on display 39, where a user can select conditions for copying. When start key 401 of keypad 40 is pressed by a user, CPU 44 carries out a copying in accordance with the selected conditions.

Conditions selectable in the menu screen are divided into four categories of "Basic Copying", "Image Quality", "Scan Options", and "Output Format", and tabs corresponding to the categories are displayed on the upper part of the menu screen, If one of the tabs is touched by a user, a menu screen corresponding to the tab is displayed. A menu screen shown in FIG. 16 is a menu screen corresponding to the "Basic Copying" category.

Figure 17:
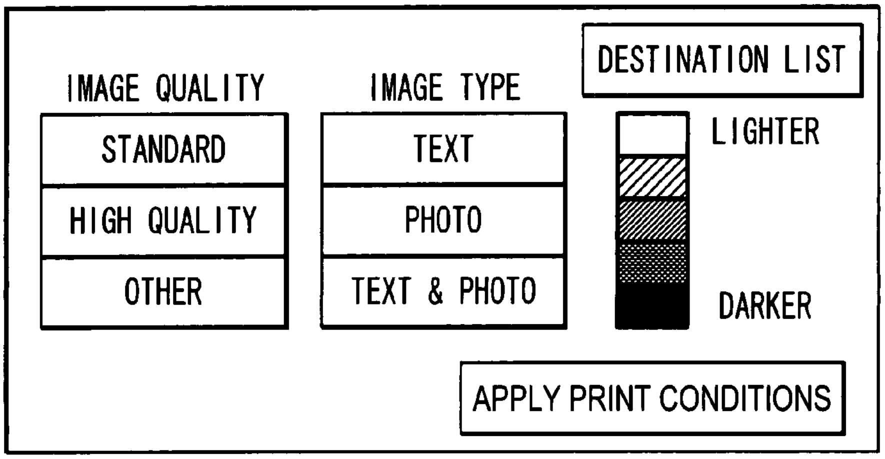
FIG. 17 is a diagram illustrating an example of a menu screen.

Alternatively, if a button "Fax" is touched by a user in the menu screen of FIG. 15, CPU 44 executes module M3. As a result, a menu screen shown in FIG. 17 is displayed on display 39, where a user can select conditions for facsimile transmission such as a destination or image quality. When start key 401 of keypad 40 is pressed by a user, CPU 44 carries out a facsimile transmission in accordance with the selected conditions. Specifically, image input unit 12 reads a document to generate image data, and fax communication interface 49 transmits the image data to a designated destination.

Figure 18:
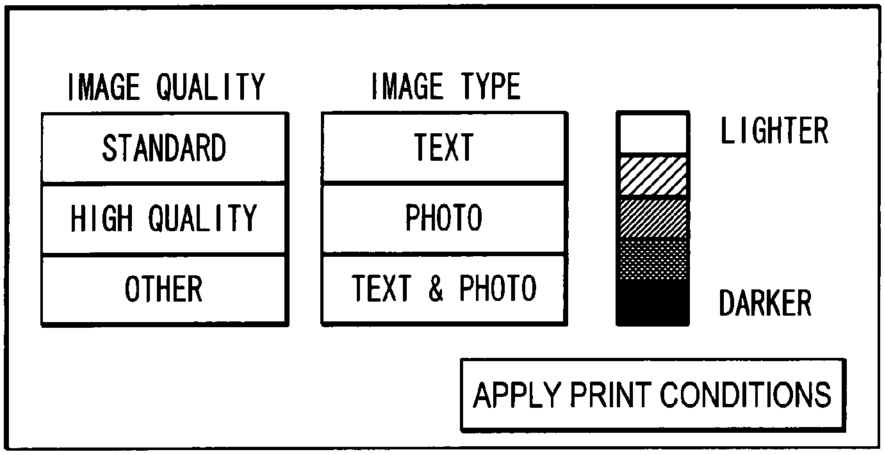
FIG. 18 is a diagram illustrating an example of a menu screen.

Alternatively, if a button "Scan" is touched by a user in the menu screen of FIG. 15, CPU 44 executes module M4. As a result, a menu screen shown in FIG. 18 is displayed on display 39, where a user can select conditions for scanning. When start key 401 of keypad 40 is pressed by a user, CPU 44 carries out a scanning in accordance with the selected conditions. Specifically, image input unit 10 reads a document to generate image data, and storage device 5 stores the image data.

Alternatively, if document data and conditional data are received from computer 100 via communication interface 48, CPU 44 executes module M2 to cause image forming apparatus 1 to serve as a printer. Specifically, CPU 44 generates image data on the basis of the document data and the conditional data, and provides the image data to image output unit 6. Image output unit 6 forms an image on recording medium 10 in accordance with the image data.

Now, a selection of conditions for copying will be described.

In the right corner of a menu screen of FIG. 16, a button "Apply Print Conditions" is displayed. Print conditions are conditions for image forming using a printer function of image forming apparatus 1, namely conditions represented by conditional data sent from computer 100. Storage device 5 is able to store plural pieces of conditional data, and process image data in accordance with conditional data selected by a user from among those stored. Processing image data is, specifically, carrying out a function of copying, facsimile transmission/reception, or scanning that is provided in image forming apparatus 1.

Figure 19:
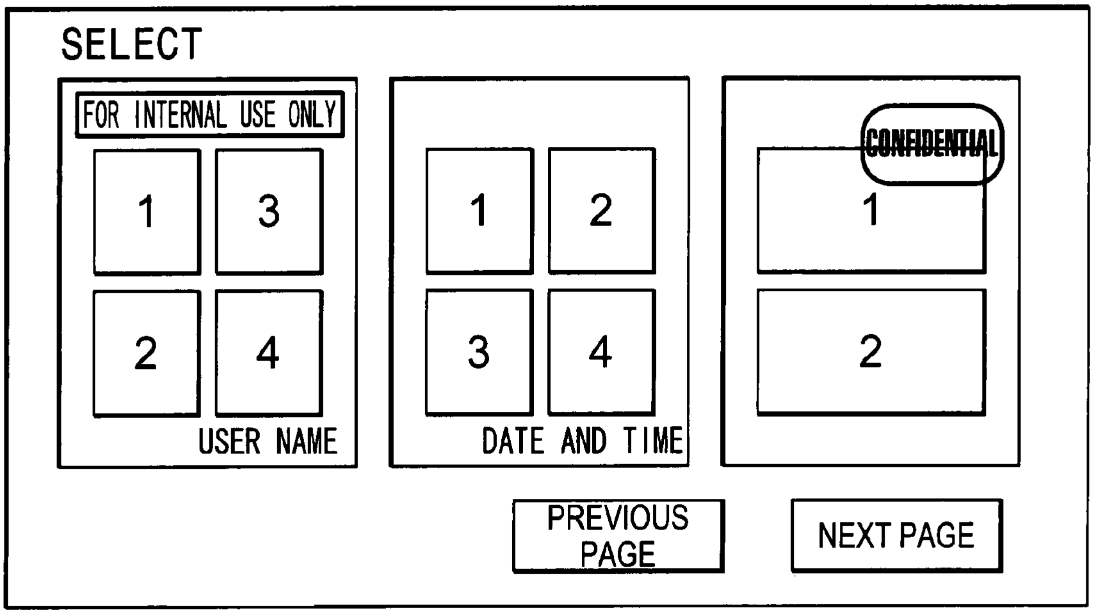
FIG. 19 is a diagram illustrating a screen for selecting conditional data.

If a user touches the button "Apply Print Conditions", a screen for selecting conditional data for use is displayed on display 39. FIG. 19 is a diagram illustrating a screen for selecting conditional data. In the screen, layout reduced images, which are explained in connection with FIG. 12, are displayed. A user selects one of the layout reduced images, and touches an area of the selected layout reduced image. CPU 44 identifies the touched area by use of a sensing capability of display 39, and determines conditional data corresponding to the layout reduced image displayed in the identified area.

It is to be noted that if a "Display Layout Reduced Image" checkbox is not checked in a dialog box of FIG. 12, a saved name entered in the dialog box may be displayed.

Figure 20:
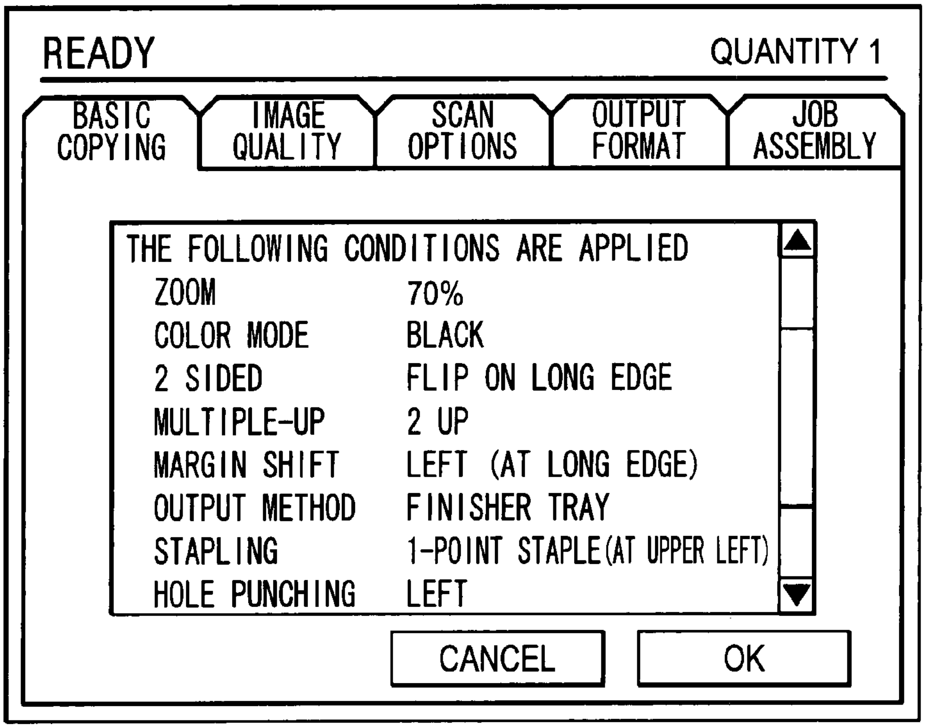
FIG. 20 is a diagram illustrating a screen displaying a list of conditions.
Figure 21:
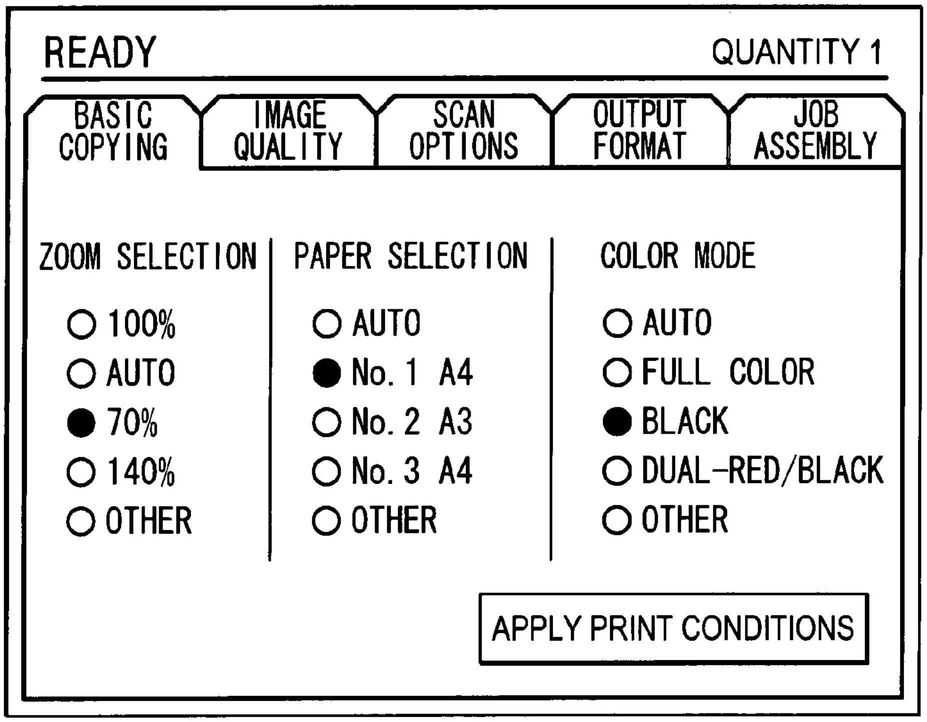
FIG. 21 is a diagram illustrating an example of a menu screen.
Figure 22:
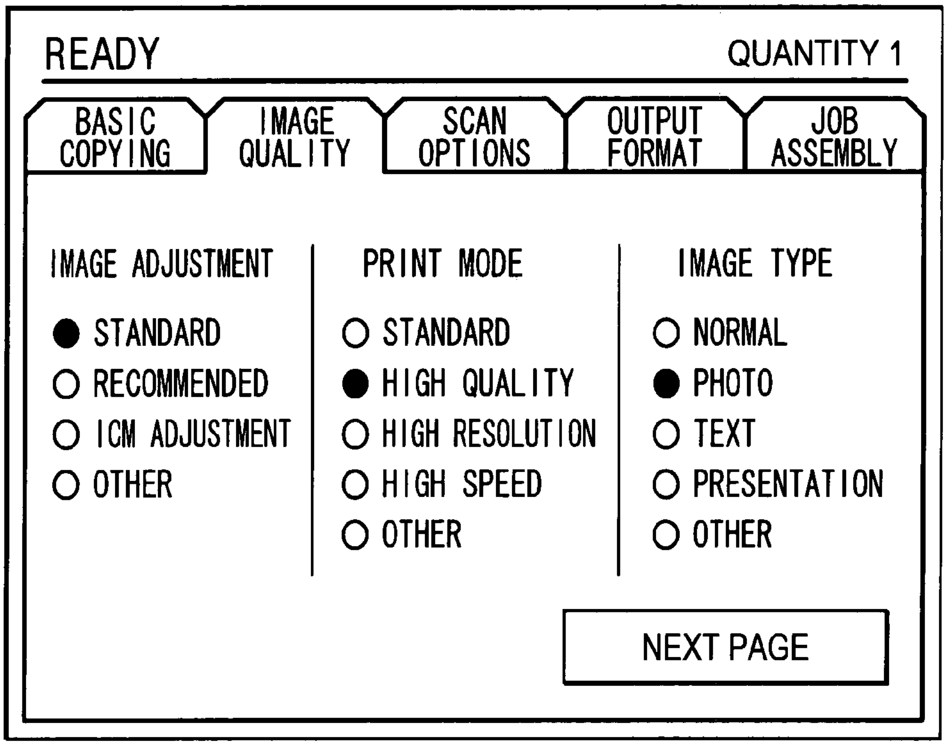
FIG. 22 is a diagram illustrating an example of a menu screen of an "Image Adjustment" category.
Figure 23:
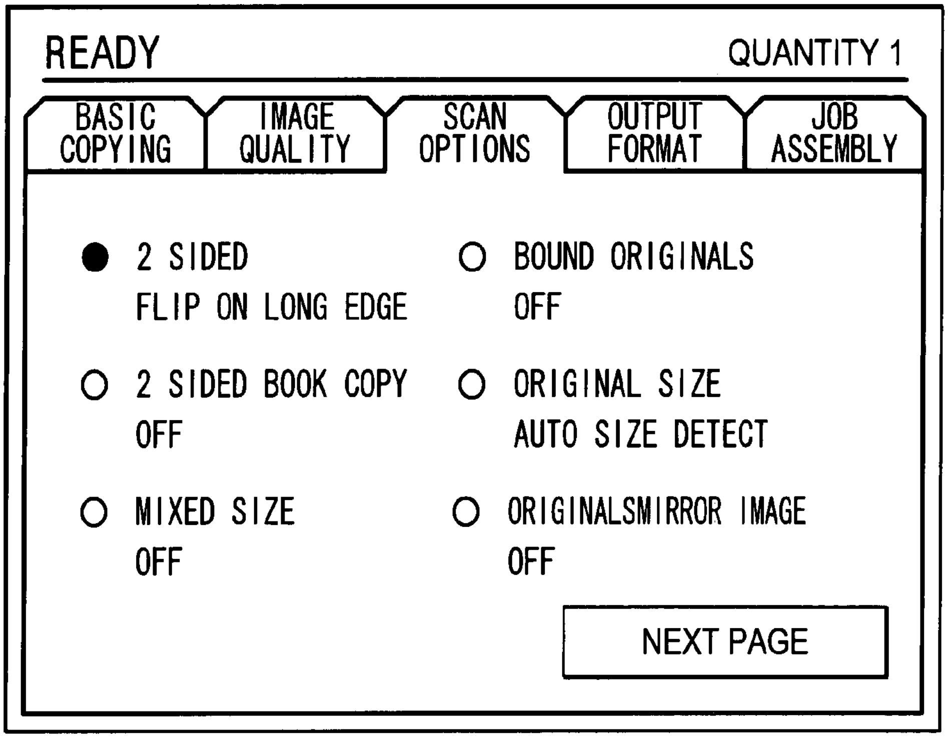
FIG. 23 is a diagram illustrating an example of a menu screen of a "Read" category.
Figure 24:
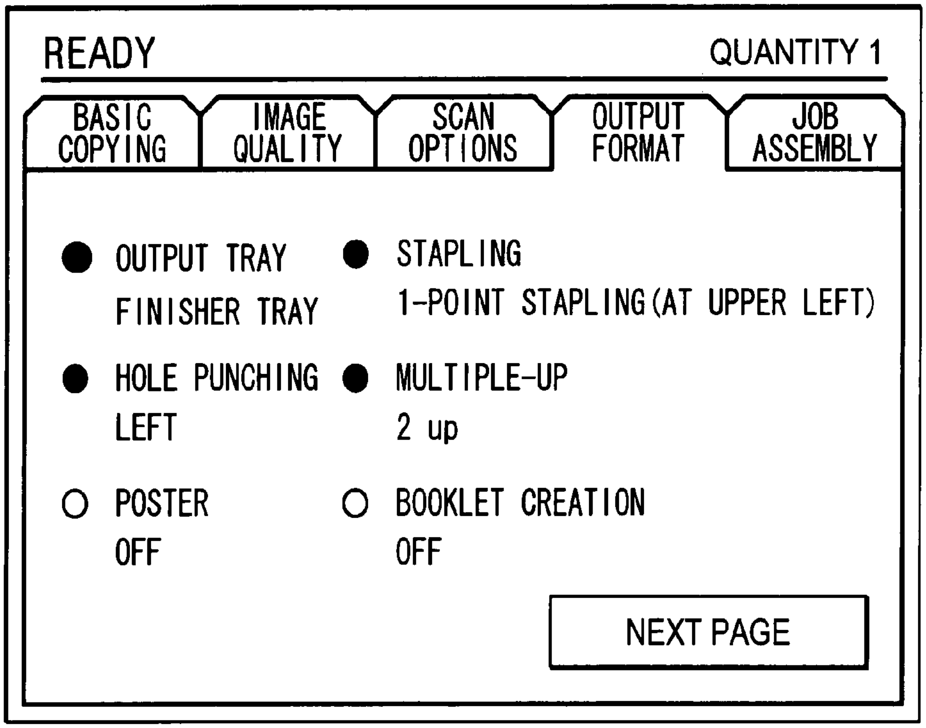
FIG. 24 is a diagram illustrating an example of a menu screen of an "Output Style" category.

If conditional data is selected by a user in the screen of FIG. 19, CPU 44 causes display 39 to display a list of conditions represented by the selected conditional data. FIG. 20 is a diagram illustrating a screen displaying a list of conditions. If a button "Cancel" provided at the bottom of the list is touched by a user, CPU 44 cancels the selection of the conditional data, and causes display 39 to display the screen FIG. 19 again. On the other hand, if a button "OK" is touched by a user, CPU 44 configures conditions for copying in accordance with the conditional data, and causes display 39 to display a menu screen displaying the configured conditions. FIG. 21 is a diagram illustrating a menu screen displayed on display 39. When a menu screen is displayed, a menu screen of a "Basic Copying" category is displayed first. In the left side of each item is displayed a circular hole, and if clicked, a circular hole with a black dot is displayed. While FIG. 16 shows a menu screen in which default settings are selected, FIG. 21 shows a menu screen in which some settings are changed in accordance with conditional data. FIGS. 22, 23, and 24 show menu screens "Image Quality", "Scan Options", and "Output Format" categories, respectively.

Figure 25:
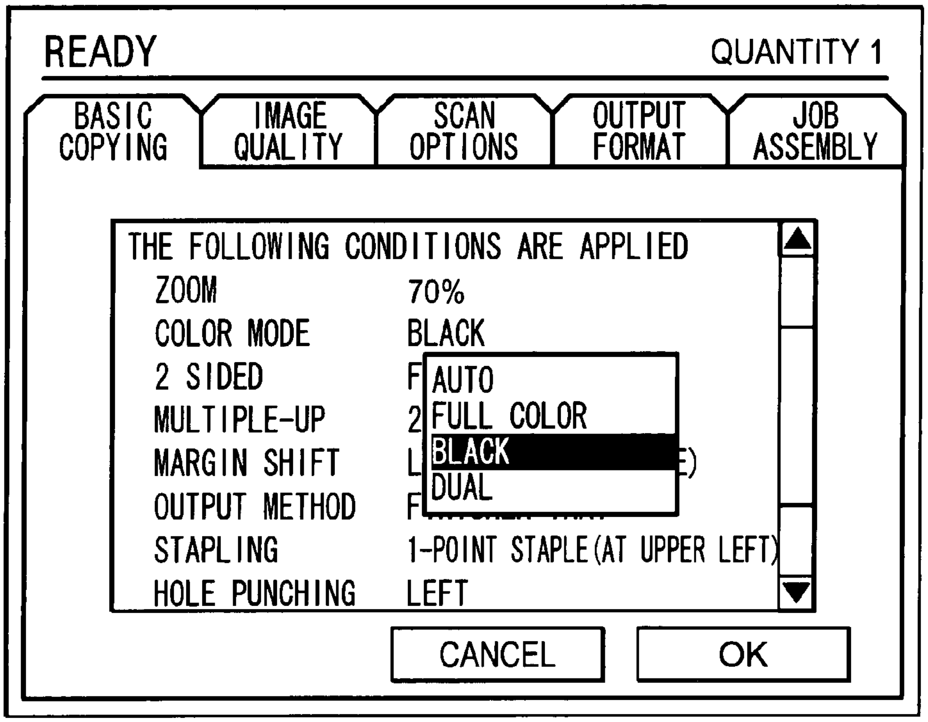
FIG. 25 is a diagram illustrating a screen displaying a list of conditions in which a pull-down menu is displayed.

Conditions set in accordance with conditional data may be changed. For example, conditions may be re-selected by a user in menu screens of FIGS. 21 to 24. Alternatively, a pull-down menu for re-selection may be displayed as shown in FIG. 25, in response to a user's click of an item in a menu screen of FIG. 20. FIG. 25 shows a pull-down menu that is displayed in response to a user's click of a "Color Mode" item.

Now, an operation of image forming apparatus 1 will be described.

Figure 26:
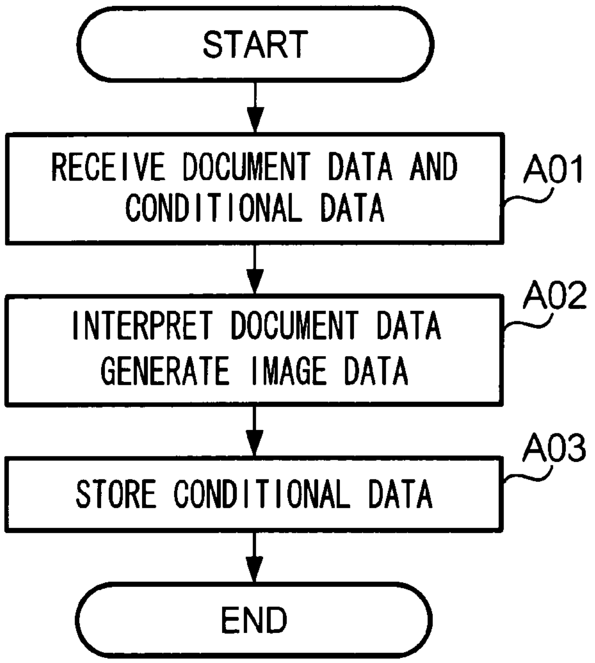
FIG. 26 is a flowchart of an operation performed by image forming apparatus 1.

FIG. 26 is a flowchart of an image forming operation performed by image forming apparatus 1 using a printer function. Image forming apparatus 1 is on, and program P is being executed by CPU 44. In the flow, ready and waiting image forming apparatus 1 receives document data and conditional data from computer 100. The conditional data is assumed to be that shown in FIGS. 11 and 12.

At step A01, CPU 44 receives document data and conditional data sent from computer 100, via communication interface 48.

Figure 27:
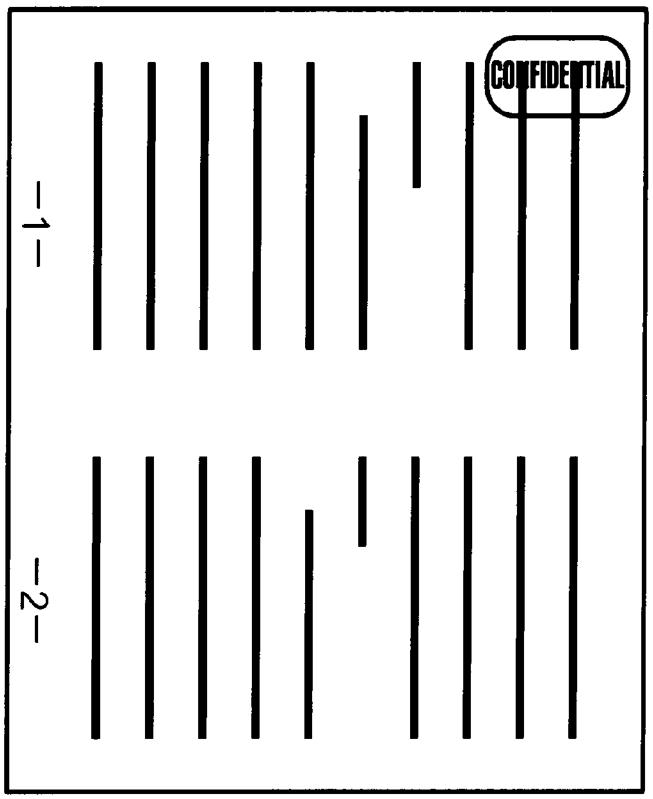
FIG. 27 is a diagram illustrating an example of a formed image.

At step A02, CPU 44 forms an image in accordance with the document data and conditional data. Specifically, CPU 44 executes module M2. Namely, CPU 44 interprets the document data which is written in the page-description language, generates image data on the basis of the document data and conditions represented by the conditional data, and provides the image data to image output unit 6. Image output unit 6 forms an image on recording medium 10 on the basis of the image data. FIG. 27 is a diagram illustrating an example of the formed image. In the example of FIG. 27, an A4 sheet is used as recording medium 10, and images of two pages are formed on the sheet. Image orientation is "Portrait", and image order is "Left to Right". Further, a watermark "Confidential" is printed.

At step A03, CPU 44 stores conditions represented by the above conditional data in storage device 5, that correspond to items that are set to be saved using a function of printer driver PD, namely conditions corresponding to items whose flag in the third field of FIG. 13 is "1".

Now, an operation of image forming apparatus 1 using conditional data stored in storage device 5 will be described.

As described above, image forming apparatus 1 has, in addition to a printer function, a copying function, a scanner function, and a facsimile function, and the apparatus is able to perform any of the functions in accordance with conditional data. Below is a description of a case of copying in accordance with conditional data.

Figure 28:
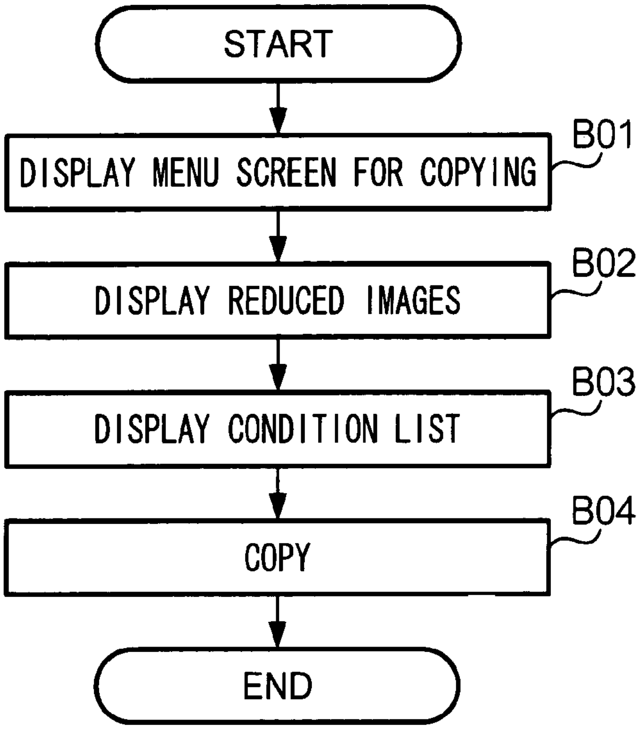
FIG. 28 is a flowchart of an operation performed by image forming apparatus 1.

FIG. 28 is a flowchart of an operation performed by CPU 44 when making a copy in accordance with conditional data.

At first, image forming apparatus 1 is in a standby state, and displays a menu screen shown in FIG. 15 on display 39. In this situation, if a user places a document on original platen 53 of document feeder 52, and touches a button "Copy" of the menu screen, an operation described below will be carried out.

At step B01, CPU 44 displays a menu screen shown in FIG. 16 on display 39, and awaits a user's instruction.

A user wishing to make a copy using conditional data touches a button "Apply Print Conditions", and consequently CPU 44 performs a process of step B02.

At step B02, CPU 44 causes display 39 to display a screen shown in FIG. 19, and awaits a user's instruction. In this situation, if it is assumed that an operation shown in FIG. 26 has been performed plural times, and plural pieces of conditional data have been stored in storage device 5, plural layout reduced images corresponding to the plural pieces of conditional data are displayed. A user selects one of the layout reduced images, and touches an area of the selected layout reduced image. CPU 44 identifies the touched area by use of a sensing capability of display 39, and determines conditional data corresponding to the layout reduced image displayed in the identified area. In this description, it is assumed that a reduced image in the right side of FIG. 19 is touched by a user. The reduced image corresponds to conditions used for forming an image of FIG. 27.

At step B03, CPU 44 reads the determined conditional data from storage device 5, causes display 39 to display a list of conditions shown in FIG. 20, and awaits a user's instruction. If a user touches a button "Cancel", the selection of the conditional data is cancelled, and the screen of FIG. 19 is displayed again. On the other hand, if a user touches a button "OK", a menu screen of FIG. 21 is displayed. In the menu screen, a user may change conditions, as described above. A user may switch the menu screen to those of FIGS. 22 to 24 by touching a corresponding tab.

After desired conditions are selected, a user presses start key 401, and consequently CPU 44 performs a process of step B04.

At step B04, CPU 44 starts to make a copy. Specifically, first, document feeder 52 feeds a document onto platen glass 2, and image input unit 12 reads the document placed on platen glass 2. Second, CPU 44 generates image data representing the image data in accordance with conditional data, and provides the image data to image output unit 6. Fourth, image output unit 6 forms an image on recording medium 10 in accordance with the image data. The image is formed in accordance with the same conditions as those for forming an image of FIG. 27.

The foregoing is a description of an operation of CPU 44 making a copy in accordance with conditional data.

In the exemplary embodiment, conditional data may be used for a facsimile transmission. In this case, CPU 44, in response to a user's touch on an "Apply Print Conditions" button of the menu screen of FIG. 17, causes display 39 to display a screen of FIG. 19. A user selects conditional data on the screen of FIG. 19, and enters a destination fax number. When a user presses start key 401, image output unit 12 reads a document, and CPU 44 generates image data of the document in accordance with conditional data. Subsequently, CPU 44 sends the image data to the designated destination.

(2) Modifications

The above exemplary embodiment may be modified as described below.

(2-1) First Modification

In the above exemplary embodiment, where conditions are determined on the basis of conditional data and used for copying, paper size data, which is designated in document data for each page of a document, may be used for selecting copy paper.

If the paper size varies from page to page, "Auto" may be specified as a condition of "Paper Size". In this case, CPU 44 determines the paper size of each page, and selects recording medium 10 on which each page can be printed at an equal magnification and whose size is minimum.

Alternatively, if the paper size specified in conditional data or document data is different from that of copy paper, an image read from a document may be reduced or enlarged. For example, if the paper size specified in conditional data or document data is A4, and the size of copy paper is B5, an image read from a document is enlarged to A4 size and thereafter formed on recording medium 10.

(2-2) Second Modification

In the above exemplary embodiment, data on a header, footer, or watermark contained in document data may be extracted from the document data, and saved as conditional data. A header and a footer are items such as a document name, data and time of creation, or creator name, which are often the same from page to page, and appear at the top (header) or bottom (footer) of each page.

(2-3) Third Modification

In the above exemplary embodiment, a selection of conditional data may be preceded by a password authentication. In this case, a user name and a password are pre-stored in storage device 5 in association with each other. CPU 44, in response to a selection of a reduced image by a user, causes display 39 to display a password entry screen. CPU 44 determines whether an entered password is identical to a stored password, which corresponds to a user name contained in conditional data corresponding to the selected reduced image, and if they match, allows a copy to be made using the conditional data for copying.

Alternatively, CPU 44 may determine whether an entered password is identical to a password contained in conditional data that is sent from a computer with document data. The password is mainly used to keep others from knowing content of a confidential document to be output, and only if a password entered in a printer and the password contained in conditional data match, formation of an image is allowed. However, the password may be used for authentication before a selection of conditional data.

(2-4) Fourth Modification

In the above exemplary embodiment, a reduced image may be generated in a manner other than in accordance with document data. Instead, a reduced image may be generated in accordance with conditional data for copying, as long as conditions for image forming represented by the conditional data are identifiable. In this case, a reduced image may be a lineal drawing showing the layout of a document.

Alternatively, in addition to a reduced image, a user name, sent time of document data, or identification data of a source of document data such as a communication address may be displayed. Alternatively, without a reduced image, only a user name, sent time of document data, or identification data of a source of document data such as a communication address may be displayed.

(2-5) Fifth Modification

Figure 29:
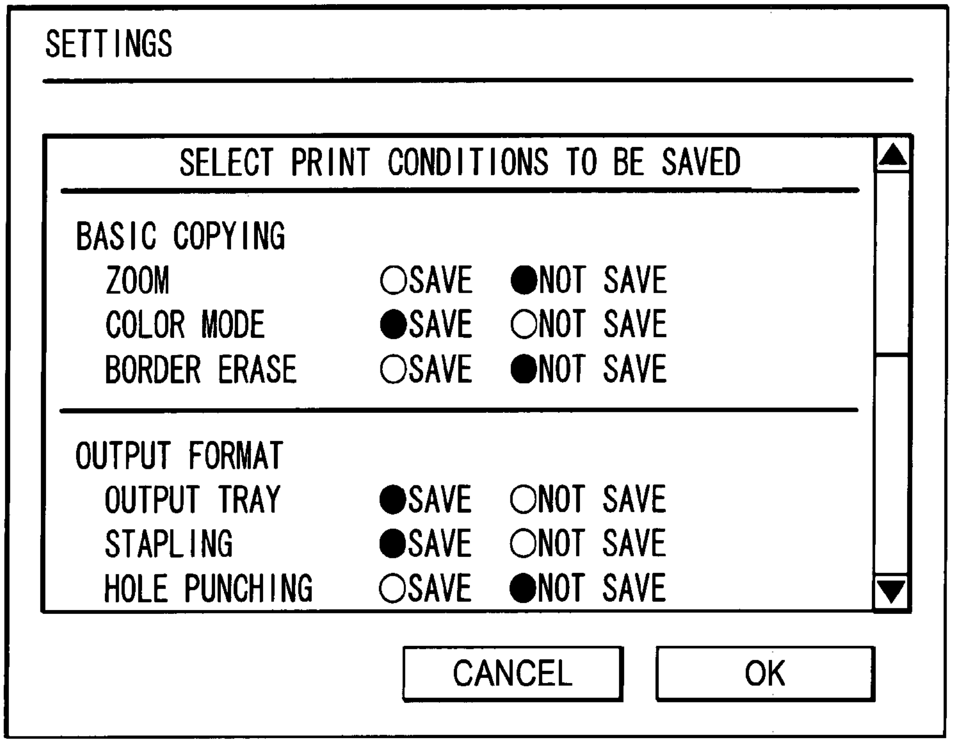
FIG. 29 is a diagram illustrating a screen for selecting conditions.

In the above exemplary embodiment, where conditions to be saved are selected in a screen of computer 100, they may be selected in a screen of image forming apparatus 1. In this case, CPU 44 causes display 39 to display a screen of FIG. 29, which is a diagram illustrating a screen for selecting conditions to be saved, and allows a user to select whether to store a condition in storage device 5 for each item.

(2-6) Sixth Modification

In the above exemplary embodiment, where a flag is set in conditional data to indicate whether a condition is to be saved, conditional data representing only conditions to be saved may be generated.

(2-7) Seventh Modification

In the above exemplary embodiment, where a printer function is used as a first function, and a copying function is used as a second function, namely conditions for image forming using a printer function are used for copying, conditional data may be used for generation of image data using a scanner function. Alternatively, conditional data may be used for forming an image received via facsimile.

Alternatively, in the above exemplary embodiment, instead of a printer function, a copying function, facsimile transmitting function, facsimile receiving function, or a scanner function may be used as a first function. For example, conditions for making a copy using a copying function may be stored in storage device 5, and used in a facsimile transmission.

(2-8) Eighth Modification

Program P may be stored in a recording medium such as a magnetic disk, and provided in storage device 5 via the recording medium. Alternatively, program P may be transmitted to image forming apparatus 1 via a communication network, and provided in storage device 5.

A function of program P may be implemented in hardware of image forming apparatus 1.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:

a first execution unit that executes a first function;

a memory that stores sets of conditions for execution of the first function;

a second execution unit that, when executing a second function, retrieves a set of conditions stored in the memory, and executes the second function in accordance with the retrieved set of conditions;

an identification data display that displays identification data indicative of each set of conditions stored in the memory;

an identification data selecting unit that receives an instruction to select identification data displayed by the identification data display;

a receiver that receives conditional data indicative of conditions for image forming; and an image forming unit that forms an image on a recording medium in accordance with the conditions indicated by the conditional data received by the receiver, wherein the first execution unit executes the first function using the receiver and the image forming unit, the second execution unit retrieves a set of conditions indicated by the identification data selected via the identification data selecting unit, from the memory, the conditional data contains item data indicative of an item of a condition to be stored in a destination device, the memory stores the conditions indicated by the conditional data received by the receiver, as a set of conditions for execution of the first function, and the memory stores, among the conditions indicated by the conditional data, conditions corresponding to the item indicated by the item data, as a set.

2. An image forming apparatus comprising:

a first execution unit that executes a first function;

a memory that stores sets of conditions for execution of the first function;

a second execution unit that, when executing a second function, retrieves a set of conditions stored in the memory, and executes the second function in accordance with the retrieved set of conditions;

an identification data display that displays identification data indicative of each set of conditions stored in the memory;

an identification data selecting unit that receives an instruction to select identification data displayed by the identification data display;

a scanner that reads a document and generates image data indicative of the document;

a destination receiver that receives an instruction specifying a destination of the image data generated by the scanner; and an image sender that sends the image data generated by the scanner to the destination specified via the destination receiver, wherein the second execution unit retrieves a set of conditions indicated by the identification data selected via the identification data selecting unit, from the memory, and the second execution unit executes the second function using the scanner, the destination receiver, and the image sender.

3. An image forming system comprising:

a computer comprising:

a condition selecting unit that receives an instruction specifying conditions for image forming;

a conditional data generation unit that generates conditional data indicative of the conditions selected via the condition selecting unit; and a sender that sends the conditional data generated by the conditional data generation unit; and an image forming apparatus comprising:

a first execution unit that executes a first function;

a memory that stores sets of conditions for execution of the first function;

a second execution unit that, when executing a second function, retrieves a set of conditions stored in the memory, and executes the second function in accordance with the retrieved set of conditions;

an identification data display that displays identification data indicative of each set of conditions stored in the memory;

an identification data selecting unit that receives an instruction to select identification data displayed by the identification data display;

a receiver that receives the conditional data indicative of conditions for image forming; and an image forming unit that forms an image on a recording medium in accordance with the conditions indicated by the conditional data received by the receiver, wherein the first execution unit executes the first function using the receiver and the image forming unit, the second execution unit retrieves a set of conditions indicated by the identification data selected via the identification data selecting unit, from the memory, the conditional data contains item data indicative of an item of a condition to be stored in a destination device, the memory stores the conditions indicated by the conditional data received by the receiver, as a set of conditions for execution of the first function, and the memory stores, among the conditions indicated by the conditional data, conditions corresponding to the item indicated by the item data, as a set.

4. An image forming system comprising:

a computer comprising:

a condition selecting unit that receives an instruction specifying conditions for image forming;

a conditional data generation unit that generates conditional data indicative of the conditions selected via the condition selecting unit; and a sender that sends the conditional data generated by the conditional data generation unit; and an image forming apparatus comprising:

a receiver that receives the conditional data sent from the computer;

a first execution unit that executes a first function in accordance with the conditions indicated by the conditional data received by the receiver;

a memory that stores sets of conditions for execution of the first function;

a second execution unit that, when executing a second function, retrieves a set of conditions stored in the memory, and executes the second function in accordance with the retrieved set of conditions;

an identification data display that displays identification data indicative of each set of conditions stored in the memory;

an identification data selecting unit that receives an instruction to select identification data displayed by the identification data display, a scanner that reads a document and generates image data indicative of the document;

a destination receiver that receives an instruction specifying a destination of the image data generated by the scanner; and an image sender that sends the image data generated by the scanner to the destination specified via the destination receiver, wherein the second execution unit retrieves a set of conditions indicated by the identification data selected via the identification data selecting unit, from the memory, and the second execution unit executes the second function using the scanner, the destination receiver, and the image sender.

5. A computer readable medium storing a program for execution by a computer included in an image forming apparatus having a first execution unit, a memory, a receiver, an identification data display, and an image forming unit, the program comprising instructions for:

executing a first function by the first execution unit;

storing, in the memory, sets of conditions for execution of the first function;

when executing a second function, retrieving a set of conditions stored in the memory, and executing the second function in accordance with the retrieved set of conditions;

displaying, on the identification data display, identification data indicative of each set of conditions stored in the memory;

receiving, by the receiver, an instruction to select identification data displayed by the identification data display;

receiving conditional data indicative of conditions for image forming; and forming the image on a recording medium by the image forming unit in accordance with the conditions indicated by the conditional data received by the receiver, wherein a set of conditions indicated by the selected identification data is retrieved from the memory, in the step of execution, the first execution unit executes the first function using the receiver and the image forming unit, the conditional data contains item data indicative of an item of a condition to be stored in a destination device, in the step of storing, the memory stores the conditions indicated by the received conditional data, as a set of conditions for execution of the first function, and in the step of storing, the memory stores, among the conditions indicated by the conditional data, conditions corresponding to the item indicated by the item data, as a set.

6. A computer readable medium storing a program for execution by a computer included in an image forming apparatus having a first execution unit, a second execution unit, a memory, an identification data display, a scanner, an image sender, a destination receiver, and an image forming unit, the program comprising instructions for:

executing a first function by the first execution unit;

storing, by the memory, sets of conditions for execution of the first function;

retrieving, by the second execution unit, when executing a second function, a set of conditions stored in the memory, and executing the second function in accordance with the retrieved set of conditions;

displaying, on the identification data display, identification data indicative of each set of conditions stored in the memory;

receiving an instruction to select identification data displayed by the identification data display;

reading a document and generating image data indicative of the document by the scanner;

receiving, by the destination receiver, an instruction specifying a destination of the image data generated by the scanner; and sending, by the image sender, the image data generated by the scanner to the specified destination, wherein the second execution unit retrieves a set of conditions indicated by the selected identification data from the memory, and the second execution unit executes the second function using the scanner, the destination receiver, and the image sender.

* * * * *